US010259312B2

(12) United States Patent
Cox et al.

(10) Patent No.: US 10,259,312 B2
(45) Date of Patent: *Apr. 16, 2019

(54) SPACE-MAXIMIZING CLUTCH ARRANGEMENT FOR VEHICLE DRIVE WHEEL

(71) Applicant: Borealis Technical Limited, North Plains, OR (US)

(72) Inventors: Isaiah W. Cox, London (GB); Jan Vana, Prague (CZ); Joseph Goldman, Pikesville, MD (US)

(73) Assignee: Borealis Technical Limited, Gibraltar (GI)

( * ) Notice: Subject to any disclaimer, the term of this patent is extended or adjusted under 35 U.S.C. 154(b) by 54 days.

This patent is subject to a terminal disclaimer.

(21) Appl. No.: 15/350,953

(22) Filed: Nov. 14, 2016

(65) Prior Publication Data

US 2017/0057336 A1    Mar. 2, 2017

Related U.S. Application Data

(63) Continuation of application No. 14/590,898, filed on Jan. 6, 2015, now Pat. No. 9,522,728.

(51) Int. Cl.
*B60K 7/00* (2006.01)
*B64C 25/40* (2006.01)
(Continued)

(52) U.S. Cl.
CPC ............ *B60K 7/0007* (2013.01); *B60K 17/02* (2013.01); *B60K 17/043* (2013.01); *B64C 25/34* (2013.01); *B64C 25/405* (2013.01); *G05D 1/021* (2013.01); *B60K 2007/0038* (2013.01); *B60K 2007/0061* (2013.01); *B60K 2007/0092* (2013.01); *B60Y 2200/51* (2013.01)

(58) Field of Classification Search
CPC ................... B60K 7/00; B60K 7/0007; B60K 2007/0038; B60K 2007/0061; B60K 2007/0092; B60K 17/02; B60K 17/043; G05D 1/021; B64C 25/34; B64C 25/405; B60Y 2200/21
USPC ...................................................... 180/65.51
See application file for complete search history.

(56) References Cited

U.S. PATENT DOCUMENTS 6,657,334 B1    12/2003    Edelson
6,838,791 B2    1/2005    Edelson
(Continued)

FOREIGN PATENT DOCUMENTS

GB    2457144 A    8/2009
WO    2008027458 A2    3/2008

*Primary Examiner* — John D Walters

(57) ABSTRACT

A vehicle wheel drive assembly, particularly useful in an aircraft, is provided. The vehicle wheel drive assembly is mounted completely within a space defined by structural dimensions of a vehicle wheel and includes a drive means controllable to power the wheel and move the vehicle autonomously on a ground surface, a gear assembly drivingly connected to the drive means, and a clutch assembly operatively connected to the gear assembly. The clutch assembly is operatively mounted with respect to the gear assembly completely within an interior portion of a vehicle wheel axle on which the wheel drive assembly is mounted, thereby maximizing the space functionally available for all of the other components of the wheel drive assembly.

10 Claims, 1 Drawing Sheet

(51) Int. Cl.
    *B60K 17/04*     (2006.01)
    *B64C 25/34*     (2006.01)
    *B60K 17/02*     (2006.01)
    *G05D 1/02*     (2006.01)

(56) References Cited

U.S. PATENT DOCUMENTS

| | | |
|---|---|---|
| 7,116,019 B2 | 10/2006 | Edelson |
| 7,445,178 B2 | 11/2008 | McCoskey et al. |
| 7,469,858 B2 | 12/2008 | Edelson |
| 8,714,481 B2 * | 5/2014 | Sweet .................. B64C 25/405 244/100 R |
| 9,016,620 B2 * | 4/2015 | Wilson .................. B64C 25/405 244/100 R |
| 9,493,033 B2 * | 11/2016 | Perkins .................. B60B 19/06 |
| 2006/0273686 A1 | 12/2006 | Edelson |
| 2007/0282491 A1 | 12/2007 | Cox et al. |
| 2009/0152055 A1 | 6/2009 | Cox |
| 2009/0261197 A1 | 10/2009 | Cox et al. |
| 2010/0065678 A1 | 5/2010 | Kiyosawa |

\* cited by examiner ical Field

The present invention relates generally to clutch designs for self-propelled vehicle wheels and particularly to a space-saving clutch design and arrangement for a self-propelled vehicle drive wheel equipped with a drive means.

BACKGROUND OF THE INVENTION

The use of drive means to enable one or more vehicle wheels to be self-propelled and move the vehicle along a ground surface without reliance on another source of motive power is known in the art. A variety of vehicles, ranging from forklifts to automobiles, trucks, and aircraft, can be moved in this manner. The kinds of drive means proposed to propel vehicle wheels can also vary. Most drive means currently used to propel vehicle wheels are electric motors. When a wheel drive means is driven by gearing, a clutch is often included in the drive system to allow engagement and disengagement of a gear assembly. Wheel drive means, gear assemblies, and clutch assemblies must be located where these structures can effectively power and drive one or more vehicle wheels and thus propel the vehicle effectively on the ground. Locating all of these structures within the dimensions of the vehicle wheel enables the wheel to be as compact as possible, yet still function effectively.

The use of a drive motor structure mounted in connection with a vehicle wheel to rotate the wheel and drive the vehicle has been proposed. The use of such a drive motor structure should, ideally, move a vehicle without reliance on the vehicle's main source of motive power, whether the vehicle is an automobile, aircraft, or other vehicle. Such structures have been described in connection with aircraft. In U.S. Patent Application Publication No. US2010/0065678 to Kiyosawa, a self-propelled wheel apparatus for an aircraft with a wave gear drive and a motor coaxially linked to an aircraft wheel axle with a one-way clutch to move an aircraft on the ground is described. The gear drive, motor, and clutch are all positioned coaxially adjacent to an aircraft landing gear wheel. U.S. Pat. No. 7,445,178 McCoskey et al describes a drive motor associated with aircraft nose landing gear wheels intended to drive aircraft on the ground that includes a dual cone clutch and a planetary gear system with an actuation screw mounted partially within a wheel and partially between the wheel and a landing gear strut. Neither Kiyosawa nor McCoskey et al suggests mounting all wheel drive structures completely within the axial or other dimensions of an aircraft wheel, nor do they suggest mounting wheel drive structures other than externally of an axle supporting a wheel to be driven.

Published United States patent applications, including U.S. Patent Application Publication Nos. US2006/0273686 to Edelson, US2007/0282491 to Cox et al, US2009/0152055 to Cox, US2009/0261197 to Cox, International Patent Application Publication No. WO 2008/027458 to Cox et al, and British Patent No. 2457144, owned in common with the present invention, describe aircraft drive systems that use electric drive motors to power aircraft wheels and move aircraft independently on the ground. When gear and clutch assemblies are used with such drive systems, these assemblies may be mounted within the space defined by the wheel dimensions externally of the landing gear wheel axle. The arrangement of these clutch assemblies and drive systems does not maximize available space, however.

A need exists for a wheel drive assembly, including drive means, a gear assembly, and a clutch assembly, operable to drive a vehicle wheel independently on the ground that can be located completely within a space defined by the dimensions of the vehicle wheel, wherein at least the clutch assembly is designed to be positioned within the vehicle axle, so that the wheel drive assembly is as compact as possible, yet still functions effectively to drive the vehicle wheel and move the vehicle on the ground.

SUMMARY OF THE INVENTION

It is a primary object of the present invention, therefore, to provide a wheel drive assembly, including drive means, a gear assembly, and a clutch assembly, operable to drive a vehicle wheel independently on the ground that can be located completely within a space defined by the dimensions of a vehicle wheel, wherein at least the clutch assembly is designed to be positioned within the vehicle axle, so that the wheel drive assembly is as compact as possible, yet still functions effectively to drive the vehicle wheel and move the vehicle on the ground.

It is another object of the present invention to provide a wheel drive assembly for an aircraft, including drive means, a gear assembly, and a clutch assembly, that can be located completely within the dimensions of an aircraft landing gear wheel, wherein at least the clutch assembly is designed to be positioned within the landing gear wheel axle, so that the wheel drive assembly is as compact as possible, yet still functions effectively to drive the aircraft wheel and move the aircraft autonomously on the ground.

It is an additional object of the present invention to provide a wheel drive assembly for an aircraft, including drive means, a gear assembly, and a clutch assembly, mounted completely within the dimensions of an aircraft nose or main landing gear wheel to maximize space available for all components of the wheel drive assembly.

It is a further object of the present invention to provide a wheel drive assembly for an aircraft or other vehicle, including drive means, a gear assembly, and a clutch assembly, wherein the clutch assembly is operationally mounted substantially completely within a portion of an axle of a drive wheel to maximize space available for all other components of the wheel drive assembly.

In accordance with the aforesaid objects, a vehicle wheel drive assembly, particularly useful in an aircraft, is provided. The vehicle wheel drive assembly is mounted completely within a space defined by dimensions of a vehicle wheel and includes drive means controllable to power the wheel and move the vehicle autonomously on the ground, a gear assembly drivingly connected to the drive means, and a clutch assembly operatively connected to the gear assembly. The clutch assembly is operatively mounted with respect to the gear assembly completely within an interior portion of a vehicle wheel axle on which the wheel drive assembly is mounted, thereby maximizing the space functionally available for all of the components of the wheel drive assembly.

Other objects and advantages will be apparent from the following description, drawings, and claims.

DESCRIPTION OF THE INVENTION

The present invention achieves an efficient arrangement of wheel drive assembly components in vehicle drive wheels that are powered or driven by wheel drive assemblies. Space for the wheel drive assembly components is maximized, which permits all components to fit completely within space defined by dimensions of the drive wheel. Maximizing space available within a vehicle wheel, particularly within an aircraft wheel, ensures that all wheel drive assembly components can be mounted within the maximized space and that these components may operate effectively and efficiently to move the vehicle autonomously or independently on a ground surface. Providing a compact mounting arrangement for wheel drive assembly components may also facilitate access to or removal of the wheel drive assembly components for repair and/or maintenance.

Figure 1:
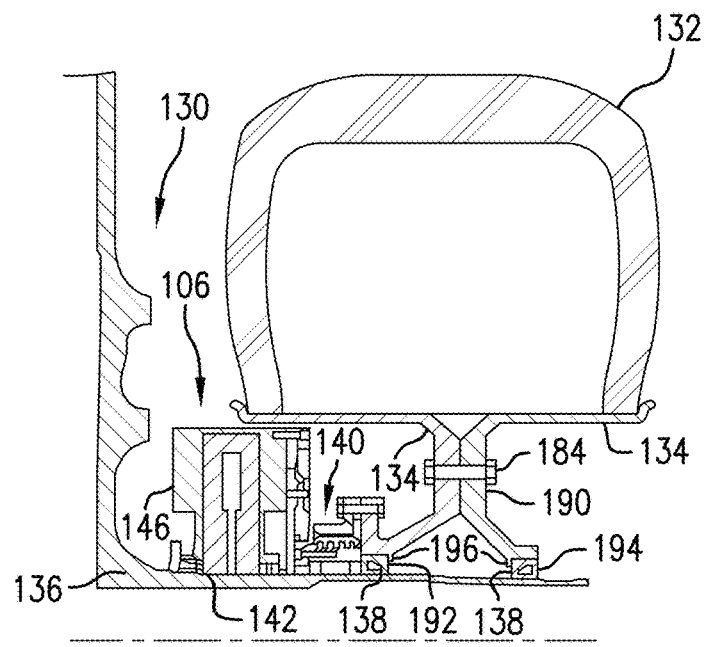
FIG. 1 illustrates a prior art wheel and motor assembly for an aircraft landing gear with all components, including a clutch assembly, located outside the dimensions of the wheel and externally of the axle.

FIG. 1 illustrates a prior art arrangement of wheel drive assembly components in a powered nose aircraft wheel system intended to move an aircraft during taxi, as described and shown in U.S. Pat. No. 7,445,178. A landing gear system 130 includes a tire 132 attached to a wheel 134. A wheel motor 106 with a rotor 146 and a stator 142 drives the wheel. A gear assembly (not numbered) is located between a cone clutch mechanism 140 and the motor components. A bolt 184 couples a first wheel rim half 190 to its corresponding second wheel rim half (not numbered). All of these structures are designed to be supported externally of the axle 136, and a portion of the wheel drive assembly is located exterior to the wheel. The configuration and arrangement of the wheel drive assembly shown in FIG. 1 differs in significant respects from that of the present invention. The design of the wheel rim prevents maximization of the space available and prevents integration of the wheel motor or drive means and associated gearing and clutch components completely within space defined by the aircraft wheel dimensions. Consequently, the arrangement shown in FIG. 1 will not realize the significant advantages of the compact, space-saving wheel drive assembly arrangement of the present invention.

Figure 2:
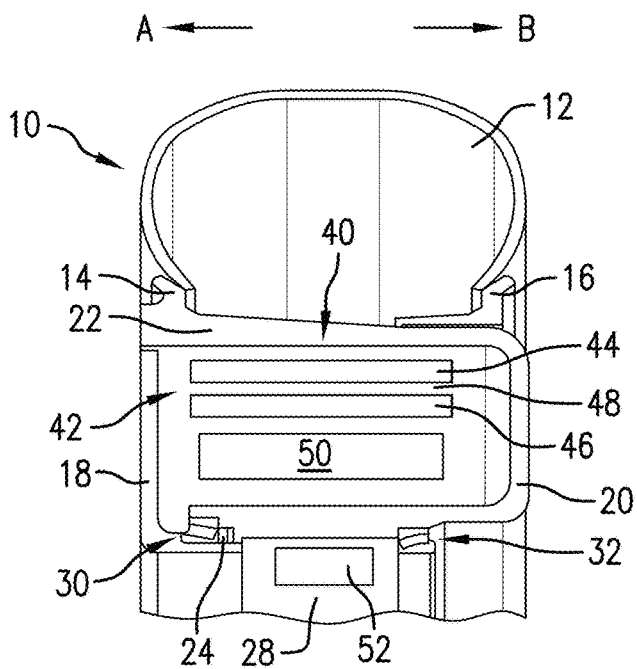
FIG. 2 is a schematic illustration of one possible arrangement of components of a vehicle wheel motor drive assembly that includes drive means, a gear assembly, and a clutch assembly, showing the clutch assembly located interiorly of an axle on which the motor drive assembly is mounted in accordance with the present invention.

FIG. 2 illustrates schematically a vehicle wheel, preferably an aircraft landing gear wheel, with a wheel drive assembly according to the present invention, including drive means, a gear assembly, and a clutch assembly, configured so that available space is maximized, and the wheel drive assembly components are mounted completely within space defined by the wheel dimensions. In FIG. 2, the arrows A and B indicate, respectively, the inboard and outboard orientation of the portion of an aircraft landing gear wheel shown. Although the present invention is described with respect to an aircraft landing gear wheel, it could be used with any vehicle drive wheel with a wheel drive assembly used to drive the vehicle on a ground surface, including, but not limited to, automobiles, trucks, and the like.

FIG. 2 shows a cross-sectional view of a portion of an aircraft landing gear wheel 10 with a tire 12 mounted on the wheel. The tire 12 is held in place by tire flanges 14 and 16. Tire flange 16 is demountable to facilitate tire changes. The wheel 10 of FIG. 2 is a two part wheel. In this design, a wheel part 18, which forms the inboard wheel section closest to a landing gear strut (not shown) is smaller than the wheel part 20, which forms the outboard wheel section and has a configuration that resembles a reverse letter "C". Tire flange 14 is preferably formed integrally with an inboard extent of portion 22 of the outboard wheel section 20, and the demountable tire flange 16 may be removably fastened to an outboard extent of portion 22 of the outboard wheel section 20. The two wheel sections 18 and 20 may be fastened together, preferably by one or more nuts and bolts 24 or equivalent fasteners to define a cavity 26. The cavity 26 formed by the respective inboard and outboard wheel sections 18 and 20 defines a maximum space available between the wheel axle 28 and the tire 12 for mounting components of a wheel drive assembly according to the present invention.

As shown in FIG. 2, the inboard wheel section 18 may be significantly shorter in length than the outboard wheel section 20 and extends along an inboard side of the wheel 10 and contacts a landing gear wheel axle 28, as described below, to be connected to the outboard wheel section 20 by a bolt or other appropriate fastener 24. As noted, the outboard wheel section 20 has a substantially reverse C-type configuration and may be supported with respect to inboard wheel section 18 and axle 28, by bearing structures 30 and 32, as shown. These bearing structures may be tapered roller bearings as shown, angular contact ball bearings, or any other type of bearings suitable for this kind of application. Other equivalent support structures may also be used.

FIG. 2 clearly shows that the wheel assembly 10 of the present invention has a configuration that is different from a common standard wheel shape and from the wheel shape shown in FIG. 1. The common standard wheel shape typically bends inwardly toward the inboard direction A from the wheel outer rim. The wheel configuration of the present invention bulges instead in the opposite direction, toward the outboard direction B. This configuration maximizes the internal wheel volume represented by cavity 26 and provides maximum space for a compact wheel drive assembly to fit completely within the space defined by the dimensions of the aircraft wheel as described herein. As a result, a preferred motor drive assembly 40 may not only have a more compact size, but also may be accessed more easily than available vehicle wheel drive assemblies.

As shown in FIG. 2, a wheel motor drive assembly 40 may be enclosed completely within the cavity 26 formed by the respective inboard and outboard wheel sections 18 and 20. The components of the wheel motor drive assembly 40 are preferably supported within the cavity 26 by support elements (not shown). It is contemplated that any support elements and/or structures suitable for this purpose may be used.

One type of motor drive assembly 40 suitable for use in the present invention includes a drive means 42 useful for powering a vehicle wheel to move the vehicle on the ground. The drive means preferably includes a rotor element 44 positioned operatively with respect to a stator element 46. The rotor element 44 may be rotatably supported with respect to the stator element 46 so that a space or gap 48 with a predetermined optimum width is maintained between the rotor element 44 and the stator element 46. While this arrangement of rotor and stator components is preferred, other rotor and stator designs that are configured to fit within the space defined by the vehicle wheel as described herein are also contemplated to be within the scope of the present invention.

Virtually any type of drive means or motor, preferably an electric motor, known in the art that is capable of generating the high torque required to drive a vehicle to move the vehicle on the ground and is sufficiently compact to fit within the cavity 26 defined as described herein may be used as the drive means 42 of the motor drive assembly 40 of the present invention. Any one of a number of available designs may be used, for example an inside-out motor in which the rotor can be internal to or external to the stator, such as that shown and described in U.S. Patent Application Publication No. 2006/0273686, the disclosure of which is incorporated herein by reference. A toroidally-wound motor, an axial flux motor, or any other electric motor geometry known in the art is also contemplated to be suitable for use as a drive means 42 in the present invention.

The drive means or electric motor selected should be able to move an aircraft landing gear wheel, or other vehicle wheel, at a desired speed and torque on a desired ground surface. One kind of electric drive motor preferred for this purpose is a high phase order electric motor of the kind described in, for example, U.S. Pat. Nos. 6,657,334; 6,838, 791; 7,116,019; and 7,469,858, all of which are owned in common with the present invention. A geared motor, such as that shown and described in U.S. Pat. No. 7,469,858, is designed to produce the torque required to move a commercial sized aircraft at an optimum speed for ground movement. The disclosures of the aforementioned patents are incorporated herein by reference. Any form of electric drive means capable of driving a landing gear wheel to move an aircraft on the ground, including but not limited to electric induction motors, permanent magnet brushless DC motors, and switched reluctance motors may also be used to drive an aircraft wheel with the wheel assembly of the present invention. Other motor designs, including pneumatic and hydraulic motors, capable of high torque operation across the desired speed range that can be integrated into an aircraft or other vehicle wheel to function as described herein may also be suitable for use in the present invention. The preferred motor drive assembly 40 additionally includes a compact gear assembly 50 drivingly connected to the motor drive assembly drive means 42 and located within the cavity 26. The gear assembly 50 driving connections to the drive means 42 are not shown. A range of different gearing configurations and arrangements may be possible for the gear assembly 50, and the specific gearing configuration selected may determine a requirement for a specific driving connection to the drive means 42. While one type of suitable gear assembly 50 is a system of planetary gears, any other type of gearing that can function for the desired purpose may also be employed. A clutch assembly 52 is preferably provided to selectively engage and disengage the gear assembly 50 and, thus, the drive means 42 from the wheel as required during operation of the wheel drive assembly.

To further maximize space available within the cavity 26 for the drive means components, including rotor 44, stator 46, and associated drive means elements (not shown), and for the gear assembly 50, the clutch assembly 52 is designed to be located completely internally of the axle 28. Gear assembly 50 and clutch assembly 52 are shown schematically in FIG. 2. The relative locations of the gear assembly 50 within the cavity 26 or space defined by the wheel sections 18 and 20 and the clutch assembly 52 within the axle 28 may be selected to enable the required operative connection between the clutch assembly and the gear assembly, which is not shown. The configurations of the drive means rotor 44, stator 46, and associated drive means elements can also affect the positions of these wheel drive assembly components within the cavity 26 and the relative locations of the gear assembly 50, which may, in turn, affect the specific location of the clutch assembly 52 within the axle 28. If required, the wheel axle 28 may be adapted to permit the required operative connection between the clutch assembly 52 and the gear assembly 50.

The operative location of the clutch assembly 52 completely within the axle 28 provides maximum flexibility in determining the best configuration for a gear assembly designed to function optimally with a particular drive means. It is no longer necessary to allocate space within the volume defined by the wheel for clutch structures in addition to the drive means and gear assembly components and associated elements.

Only half of the wheel assembly 10 and motor drive assembly 40 of the present invention are shown in FIG. 2. A mirror image of these structures is located on the opposite side of the axle 28. Additionally, these assemblies have been described in connection with a single vehicle wheel. The motor drive assembly 40 described and shown herein may also be mounted to drive simultaneously or individually, as required, more than one vehicle wheel. When the vehicle is an aircraft, the motor drive assembly 40, including drive means 42, gear assembly 50, and clutch assembly 52, may be mounted on one or more of the aircraft nose landing gear wheels or aircraft main landing gear wheels.

While the present invention has been described with respect to preferred embodiments, this is not intended to be limiting, and other arrangements and structures that perform the required functions are contemplated to be within the scope of the present invention.

INDUSTRIAL APPLICABILITY

The present invention will find its primary applicability where it is desired to provide an aircraft or other vehicle drive wheel with maximum functional space for mounting a wheel drive assembly capable of driving the vehicle independently on a ground surface, wherein wheel drive means assembly operative components, including drive means, gear assemblies and clutch assemblies may be mounted completely within the maximum functional space.

The invention claimed is:

1. A vehicle wheel drive assembly for driving a vehicle wheel autonomously on a ground surface, comprising one or more wheels rotatably mounted on one or more vehicle axles, each supporting a tire and a wheel drive system mounted to drive said one or more wheels, wherein each said wheel comprises inboard and outboard sections configured to define a cavity with maximum dimensions between said axle and said tire, and components of said wheel drive system comprising a drive motor and a gear assembly drivingly connected to said drive motor are operatively positioned completely within said cavity, and components of said wheel drive system comprising a clutch assembly are located completely within an interior space of said one or more axles and positioned to be operatively engaged with said gear assembly to drive said drive motor and move said vehicle on said ground surface.

2. The assembly of claim 1, wherein said drive motor comprises an electric drive motor controllable to move the vehicle autonomously on the ground surface without reliance on another source of motive power.

3. The assembly of claim 2, wherein said electric drive motor comprises a rotor element rotatably supported to maintain a gap having a predetermined optimum width with a stator element.

4. The assembly of claim 3, wherein said electric drive motor is selected from the group comprising axial flux motors, toroidally wound motors, electric induction motors, permanent magnet brushless DC motors, and switched reluctance motors.

5. The assembly of claim 1, wherein said maximum volume cavity is defined by a reverse C-shaped outboard wheel section connected to a smaller inboard wheel section.

6. The assembly of claim 1, wherein said vehicle comprises an automobile or a truck.

7. A method for maximizing space available within vehicle wheels to completely support components of a vehicle drive wheel system within maximized space and drive a vehicle autonomously on a ground surface, comprising:
  a. for one or more vehicle wheels, providing inboard and outboard vehicle wheel sections and supporting said wheel sections on a vehicle axle and connecting said wheel sections to define a maximum volume within said wheel sections between said vehicle wheel axle and a tire mounted on a wheel portion outwardly of said vehicle axle;
  b. providing a vehicle drive wheel system for said one or more vehicle wheels comprising a motor driven by a gear assembly and operatively positioning said vehicle drive wheel system completely within said maximum volume;
  c. providing a clutch assembly designed to operatively engage said gear assembly and positioning said clutch assembly completely within an interior of said vehicle axle to operatively engage said gear assembly; and
  d. operating said vehicle wheel drive system to operate said clutch assembly to engage said gear assembly to drive said motor and drive said one or more vehicle wheels to drive the vehicle autonomously on a ground surface.

8. The method of claim 7, wherein said wheel sections comprise a reverse C-shaped outboard wheel section connected to a smaller inboard wheel section connected to define a maximum volume cavity between the vehicle wheel axle and the tire of the one or more vehicle wheels.

9. The method of claim 7, further comprising supporting the clutch assembly within the vehicle wheel axle in operative engagement with said gear assembly so that said clutch assembly engages or disengages said gear assembly as required during operation of said vehicle drive system to drive said vehicle.

10. The method of claim 7, further comprising operatively positioning said vehicle drive wheel system completely within said maximum volume in the one or more wheels of an automobile or a truck and driving the automobile or truck autonomously on the ground surface.

* * * * *